United States Patent [19]

Porter et al.

[11] Patent Number: 5,219,045
[45] Date of Patent: Jun. 15, 1993

[54] LINEAR MECHANICAL LOCK WITH ONE-PIECE LOCK HOUSING

[75] Inventors: Clyde R. Porter, Los Angeles; George V. Babiciuc, Pasadena, both of Calif.

[73] Assignee: P. L. Porter Company, Woodland Hills, Calif.

[21] Appl. No.: 963,506

[22] Filed: Oct. 19, 1992

Related U.S. Application Data

[63] Continuation of Ser. No. 717,521, Jun. 19, 1991, abandoned.

[51] Int. Cl.⁵ ............................................. B65H 59/10
[52] U.S. Cl. ...................................... 188/67; 74/531; 188/77 W; 248/410; 248/414; 297/375
[58] Field of Search ............... 188/67, 77 W; 297/374, 297/375; 24/531; 248/410, 414, 354.1

[56] References Cited

U.S. PATENT DOCUMENTS

| 545,492 | 9/1895 | Hall | 188/77 W X |
| 2,387,711 | 10/1945 | Barr | 188/77 W |
| 3,386,311 | 6/1968 | Kobayashi et al. | 188/67 X |
| 3,874,480 | 4/1975 | Porter et al. | 188/77 W X |
| 4,572,022 | 2/1986 | Mettler | 188/67 X |

FOREIGN PATENT DOCUMENTS

| 011995 | 7/1956 | Fed. Rep. of Germany | 248/354.1 |
| 742788 | 1/1956 | United Kingdom | 248/354.1 |

Primary Examiner—George E. A. Halvosa
Attorney, Agent, or Firm—Beehler & Pavitt

[57] ABSTRACT

Simplified assembly and reduced parts count in a linear mechanical lock assembly of the type where a rod is normally gripped against axial translation through a housing by a coil spring and released by unwinding the spring, is achieved by a one piece housing with integrally formed spring containment and rod bearing elements.

9 Claims, 5 Drawing Sheets

LINEAR MECHANICAL LOCK WITH ONE-PIECE LOCK HOUSING

This is a continuation of co-pending application Ser. No. 07/717,521 filed on Jun. 19, 1991, now abandoned.

BACKGROUND OF THE INVENTION

1. Field of the Invention

The present invention generally relates to the field of mechanical locking and positioning devices and more particularly concerns mechanical locks of the type where a rod is axially translatable through a lock housing, a clutch spring is axially fixed to the lock housing and normally grips the rod against axial displacement through the lock housing, and a release lever is actuatable for unwinding the spring to release the rod.

2. Background of the Invention

Mechanical locks of this type are known and have been used, especially in adjustable automotive seats. Typically, one or more mechanical locks control elevation and tilt angle of the seat, and also lock the seat on horizontal rails so that the seat can be positioned at a preferred distance from a steering wheel or dash panel. One example of such a lock is disclosed in U.S. Pat. No. 3,874,480 issued to Porter et al. and owned by the Assignee of this patent application. One end of the coil spring has an end tang which is circumferentially fixed to the lock housing. By actuating a release lever acting on an opposite free end of the coil spring, the coil spring is unwound sufficiently to enlarge its inside diameter and release the rod. Such locks typically include axial bearing surfaces which operate to angle or cant one or more end coils of the spring in response to axial loading of the rod relative to the lock housing.

In applications where bi-directional loading of the rod is anticipated, two springs may be provided, one on each side of a common release lever and axially contained between two end bushings, each bushing engaging an end tang of a corresponding spring to fix the tang and the outer end coils of the spring against rotation about the rod. The inner end coils of the springs are connected to a release lever, actuatable for simultaneously unwinding both springs to free the rod for axial movement through the housing.

The bushings serve three distinct functions. An axial bore in each bushing defines a radial bearing surface which supports the rod for sliding movement through the lock housing. A radial slot in the bushing receives an end tang of the spring, to circumferentially fix the outer end of the spring and prevent this end of the spring from turning about the rod. Finally, an axial bearing surface on the bushing is circumferentially spaced by 90 degrees from the spring tang. When the spring is pulled with the rod against the axial bearing surface by a load acting on the rod relative to the lock housing, the end coils of the spring are canted relative to the rod axis. This canting of the coil springs deforms the coils from a normal circular shape to an ellipsoid shape, and substantially increases the frictional engagement between the spring coils and the rod. The clutch spring better resists the load and makes for a more positive lock of the rod relative to the housing so long as the loading condition persists.

Prior art locks also feature a tubular sleeve which closely envelops the spring or springs, to prevent the coils from unwinding preferentially at the release lever while the coils at the opposite end remain in a rod griping condition. The sleeve prevents this result by distributing the unwinding action more evenly along the length of the spring so that all coils release the rod at substantially the same time, for positive, quick release action of the lock.

Early locks of this type were housed in a cylindrical tube open at one or both ends. The clutch spring was mounted on the rod, and other components such as end bushings, actuator levers, etc. all assembled onto the rod and then inserted into the housing. The housing wall was then swaged or welded to hold the internal components in axially fixed position within the housing. The relative positions of the lock elements in the housing is rather critical and a high degree of precision must be maintained in assembling the lock. A tube type housing makes this objective difficult to achieve with consistency.

More recently, the tube style housing has been replaced by a two-piece clam shell housing. This approach is described in European patent application number 85201888.6 filed Nov. 18, 1985, Publication number 0 182 440 83. An envelope or housing is formed by two half shelves made of stamped plate and separate from one another. The rod is first fitted with the coil spring, release lever, and a pair of end bushings which engage the ends of the coil spring. The device is assembled by mating the half shell to each other with the rod in between, then welding the half shells to the bushings to form an enclosure about the rod. The axial spacing between the bushings is fixed by this welding, thus fixing the spring between the bushings. The rod slides through the bushings and the housing when the spring is unwound to permit such movement.

Assembly of the two half-shells to make the lock housing still entails a number of difficulties. Two separate stamping dies are required to make the two half shells. Two separate pieces must be handled and must be brought into and held in positive axial registry while they are welded to the bushings to keep the unit within proper working tolerances.

For these and other reasons, further improvement is desirable in linear mechanical locks of this type, to simplify and improve the accuracy of the assembly, and to reduce the parts count of the lock.

SUMMARY OF THE INVENTION

According to this invention, a linear mechanical lock of the aforementioned type is made by forming a single sheet of heavy gauge metal into a generally tubular housing in a sequence of steps. Sheet stock is cut to obtain an initially flat blank, which is then shaped to define two half shells joined along a hinge line. The half shells are then folded along the hinge line to an intermediate stage where the half shells may be approximately 90 to 120 degrees apart. The internal components of the lock are preassembled on the rod and are assembled with the rod to the semi-processed housing blank. The half-shells are then folded together along the hinge line to a fully closed condition, forming a one-piece lock housing containing the rod and other internal components of the lock mechanism. The housing may be secured in the closed tubular condition by locking together the longitudinal edges of the sheet blank by means of a can-type fold.

A one piece metallic housing makes an electrical short between the electrodes of an electrical welder and thus precludes electrical spot welding for fixing the interior components of the lock to the housing. Instead, any bushings on the rod are axially fixed by deforming the one piece housing in various ways: a) the bushings can be circumferentially grooved and the housing swaged into the groove to axially fix the bushing, or b) the housing may be formed with holding cavities closely dimensioned to retain the bushings in fixed axial position in the housing, or c) the sheet material can be sheared transversely to the bushing and bent into the housing to form an internal shoulder bearing against the outer end of the bushing to hold the bushing against the spring.

In a presently preferred form of the invention, the bushings used in prior art locks are eliminated entirely as separate elements, and are replaced by radial and axial bearing surfaces and tang engaging portions all formed integrally with the one piece housing. This can be accomplished by embossing the sheet blank with a progressive die in a single stamping press. The rod may be supported in the housing on axially spaced sets of radial bearing surfaces. The radial bearing surfaces may be defined by raising portions of the sheet metal blank, which are circumferentially spaced in the finished tubular housing.

Two coil springs are wound coaxially on the rod and have inner ends connected by an intermediate portion continuous with the two coil springs and shaped to operate as a spring release lever. Both coil springs and the release lever are thus formed of a single length of wire, as an easy to handle unit. An end tang at the outer end of each spring is circumferentially fixed to the housing in a longitudinal slot which is defined between longitudinal edges of the sheet which are brought into close proximity when the sheet is folded to the final tubular shape of the housing or is cut in the sheet metal of the housing.

The coil springs are axially contained between axial bearing surfaces provided by side edges of raised portions of the sheet metal blank. The housing blank can be cut with integral mounting lugs perforated for receiving lock mounting hardware, a tab extending from one longitudinal edge of the blank sheet and a rectangular cut-out in an opposite longitudinal edge of the sheet. When the sheet is folded to the final closed condition of the operative housing, the tab extends generally radially from the housing to provide a mounting for a remotely operated lock release. The rectangular cut-out defines a window opposite to the release control mounting tab. The spring release lever extends through and is captive within this window, which together with the mounting tab limits the maximum angular displacement of the spring release lever from a normal position to a rod releasing position.

The parts count of the improved lock is further reduced in that the inside diameter of the one piece housing is sized to closely fit about the coil springs, replacing the sleeve used in previous locks for evenly distributing the coil release action along the length of the spring when the release lever is actuated.

The improved linear lock of this invention can be manufactured in a continuous process in a progressive die using only a single stamping press. The lock housing can be stamped from a continuous sheet metal stock and progressively formed from an initially flat sheet to a closed tubular housing with integral interior bearing surfaces. For continuous production, the blank is attached and supported between carrier strips cut integrally with the blank and sheared off at an appropriate stage of the forming process.

Such simplified continuous production is a great improvement over prior manufacturing processes for locks of this type. The two-piece lock housings used until now require separate handling of the two halves of the housing, and very costly automatic assembly machines for holding the halves in proper registry while the interior components are inserted and fixed in place, typically by spot welding. The lock construction disclosed here eliminates both the handling of the separate housing halves and the need for the automatic assembly machine. Spot welding of separate bushings to the housings in previous locks was another source of difficulty. The axial bearing surfaces and the tang receiving slots of the bushings were hard tempered for better wear characteristics. However, spot welding cannot be done on hard tempered areas of the bushing. As a result, costly and hard to control differential heat treatment of the bushings became necessary. Integration of the spring bearing surfaces into the housing overcomes these problems as well.

These and other advantages of the present invention will be better understood by reference to the following detailed description of the preferred embodiment and to the accompanying drawings.

DETAILED DESCRIPTION OF THE PREFERRED EMBODIMENT

Figure 1:
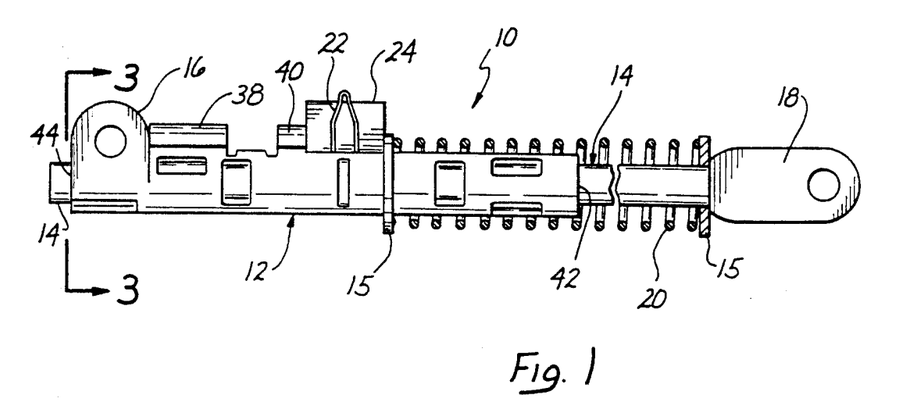
FIG. 1 is a longitudinal side view of a linear mechanical lock with a one piece housing formed according to this invention.

FIG. 1 shows a linear mechanical lock 10 with a one-piece lock housing 12 of generally tubular shape, and a rod 14 axially slidable through the housing 12. The housing includes mounting lugs 16 at one end, and the rod terminates at an opposite end in an end lug 18. Lugs 16 and 18 are perforated for receiving appropriate lock mounting hardware. A large loading coil spring 20 coaxial with housing 12 and rod 14 is compressed between a flange 15 on each of housing 12 and rod 14, biasing rod 14 to a fully extended condition towards the right of housing 12 in FIG. 1.

Figure 2:
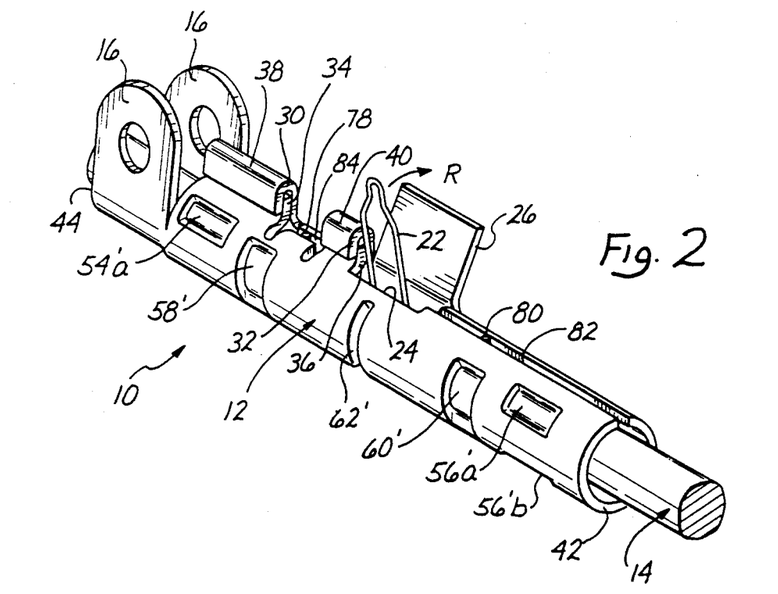
FIG. 2 is a perspective view of the lock of the FIG. 1.

FIG. 2 shows the lock 10 with loading spring 20 and flange 15 removed from the housing 12, and the end of rod 14 broken away, for clarity of illustration. The interior of lock 10 with integrated one-piece housing and integrated interior bearing surfaces is shown in FIGS. 3 through 7 and 12. The lock housing 12 is generally cylindrical, with an interior cylindrical surface 86 which extends between an inner end 42 and an outer end 44, and is secured in the tubular configuration by two can-type folds 38, 40 formed by interlocking edge portions 30, 32, 34, 36.

A spring unit 72 includes two coil springs 74 and 76 wound in mutually opposite senses on rod 14. The inner ends of the two springs are connected by an intermediate segment of wire continuous with the two springs and shaped to form a lock release lever 22. The outer ends of the two springs terminate in radially extending end tangs 78, 80, which are captive and circumferentially fixed between two pairs of opposite, slot defining edges 46, 48 and 50, 52.

The release lever 22 extends through a window 24 in the housing 12. In FIG. 2 lever 22 is shown in its normal locking position and is actuated to a rod releasing position as indicated by arrow R. The coils of springs 74, 76 have a normal interior diameter slightly smaller than the diameter of rod 14 and normally tightly grip the rod. In this normal condition of the lock 10 the rod 14 is locked against axial movement through the housing 10. When the lever 22 is actuated, the coils of springs 74, 76 are slightly unwound and their interior diameter enlarges sufficiently to allow axial translation of the rod 14. An integral mounting tab 24 extends radially from housing 12 in axial registry with the release lever 22 but circumferentially spaced from the lever 22. The tab 24 is for mounting of an actuating device, such as a Bowden cable release which enables remote actuation of the lever 22. An example of such a remote release is described in U.S. Pat. No. 4,515,034, owned by the Assignee of this invention.

Figures 3, 5, 7:
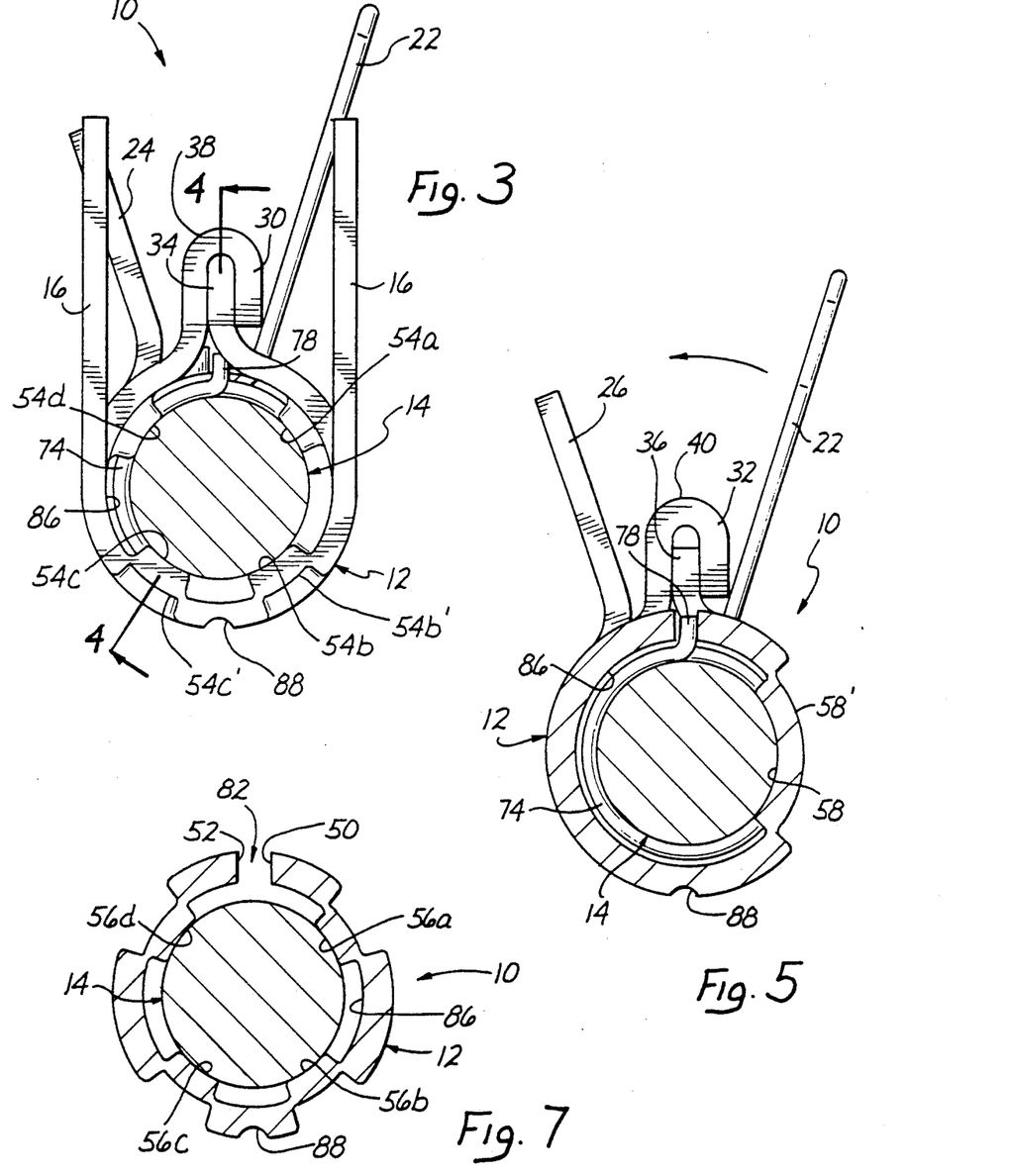
FIG. 3 is an end view of the housing taken along line 3—3 in FIG. 1, the rod being shown in cross-section.
FIG. 5 is a cross-section taken along line 5—5 in FIG. 4.
FIG. 7 is a cross-section taken along line 7—7 in FIG. 4.
Figure 4:
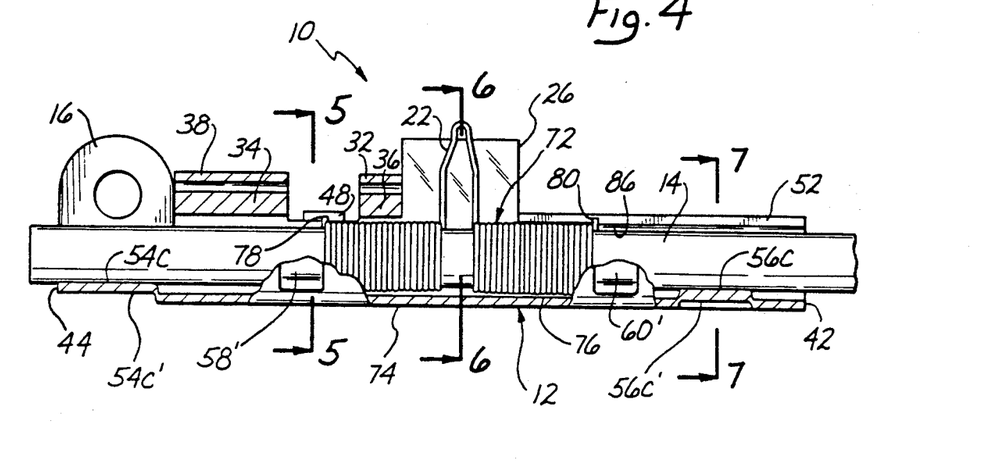
FIG. 4 is a longitudinal view as in FIG. 1, taken partly in section along line 4—4 in FIG. 3 to show the interior components of the lock.
Figure 12:
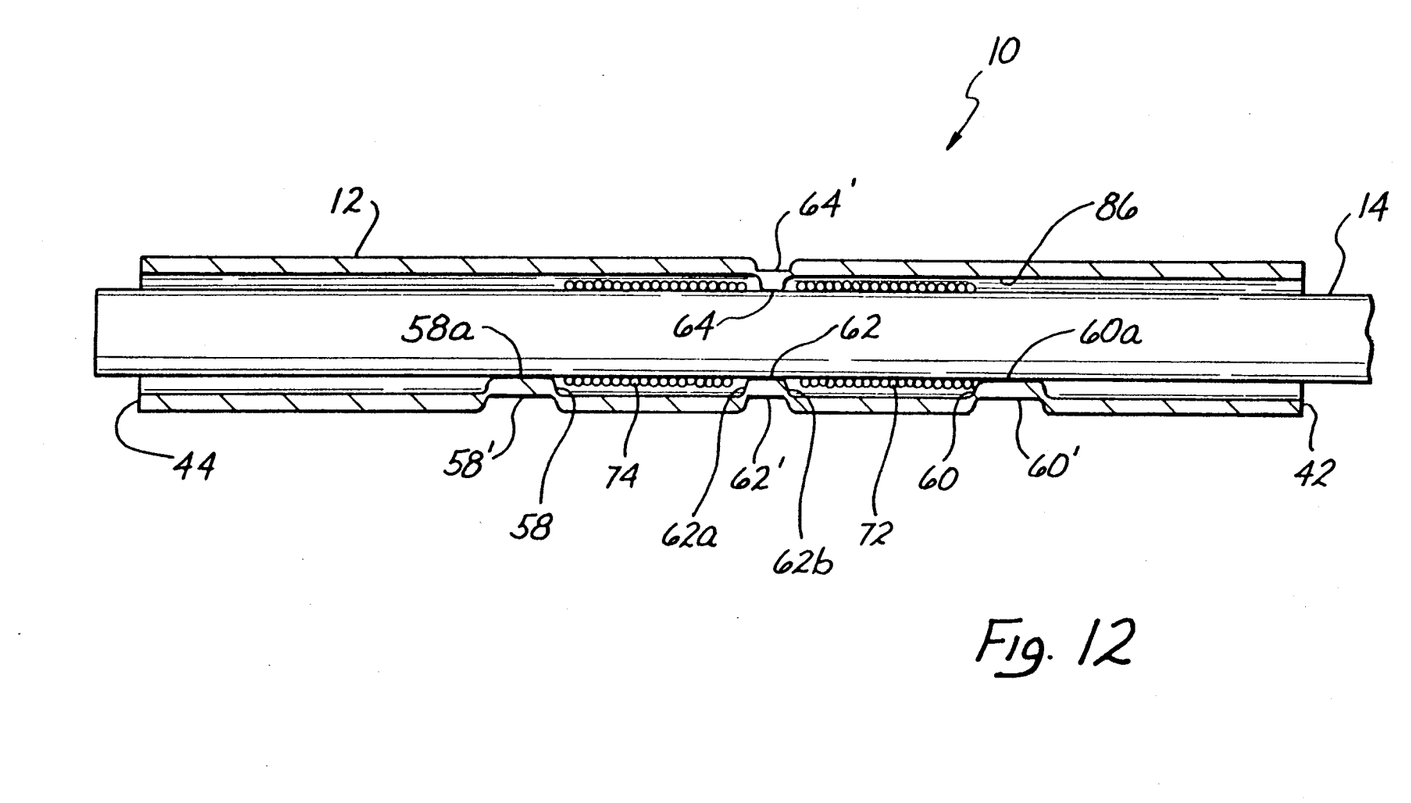
FIG. 12 is a longitudinal section taken along arrows 12—12 in FIG. 2, showing the axial of the springs between embossed axial bearing surfaces and circumferential containment by the inside surface of the housing.

Inwardly displaced portions are embossed in the housing wall and provide rod bearing surfaces and spring end bearing surfaces interior to the housing 12. The rod bearing surfaces include a first set of radial bearing surfaces 54a through 54d adjacent to end 44 of the housing, and a second set of radial bearing surfaces 56a through 56d adjacent to the opposite end 42 of the housing. The rod 14 has a smaller diameter than the outside spring diameter and is supported spaced from the interior housing surface 86 by the radial bearing surfaces 54a-d and 56a-d, as best seen in FIGS. 3, and 7. The spring end bearing surfaces include two axial bearing surfaces 58 and 60, facing each other in an axial direction, defined by side edges of embossed elements 58a and 60a. The rod bearing surfaces are circumferentially spaced about the tubular shaped housing. The spring end bearing surfaces have an overall circumferential extent lesser than the rod bearing surfaces. Only one side of each spring 74, 76 is supported by a corresponding axial bearing surface 58, 60, as shown in FIG. 12. The diametrically opposite side of the outer end of the springs is axially unsupported. This asymmetry causes the coils of the springs to become canted on the rod 14 and deformed from a normal circular shape to an ellipsoid condition when a load pulls the rod towards one or the other of the axial bearing surfaces, greatly increasing the grip of the deformed coils against rod 14 so long as the loading condition persists.

Figure 6:
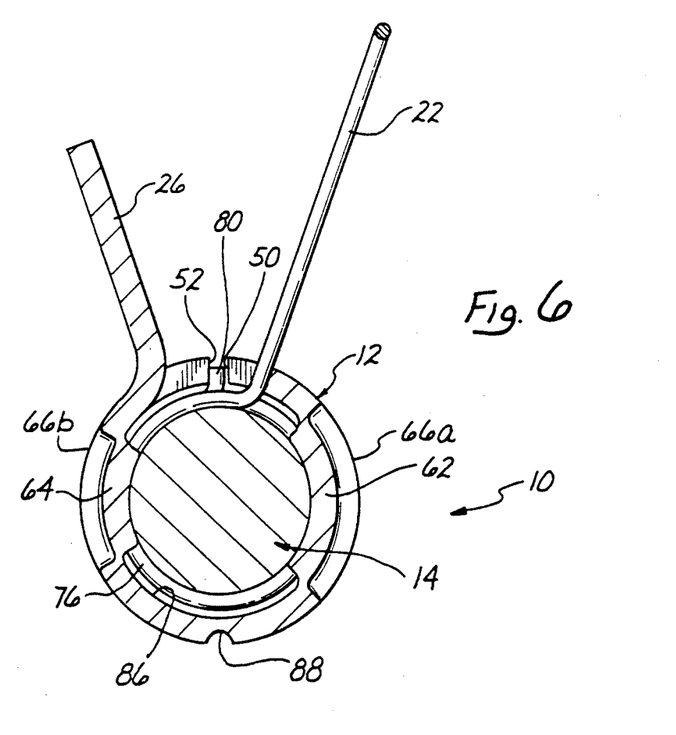
FIG. 6 is a cross-section taken along line 6—6 in FIG. 4.

Two embossed diametrically opposed spacers 62, 64, seen in FIGS. 6 and 12, are axially interposed between the two springs 74, 76 midway between the axial bearing surfaces 58, 60. Spacer 64 is shorter in an axial direction than spacer 62, so that the coils at the inner ends of the springs are canted towards spacer 64 when urged against spacer 62 by a load acting on rod 14. Spacer 62 defines axial bearing surfaces 62a, 62b along two of its edges. The axial bearing surfaces 58, 60 and 62a, 62b are positioned 90 degrees along the circumference of the housing 12 from the tang engaging slots 82, 84. Spring 74 is contained between axial bearing surfaces 58 and 62a, while spring 76 is contained between axial bearing surfaces 62b and 60, and normally hold the rod against axial translation through the housing 12. Axial bearing surfaces 62a, 62b operate on the inner end coils of the springs 74, 76 analogously to the operation of axial bearing surfaces 58, 60 on the outer end coils of the springs. When a spring is driven against the corresponding surface 62a or 62b by a load acting on the rod 14 relative to the housing 12, a deformation of the inner coils of the two springs takes place which is similar to the deformation of the outer coils described above in response to axial loading of the rod 14 relative to the housing 12, with a similar increase in locking force of the springs on rod 14.

The inside diameter of the housing 12 defined by the interior surface 86 is only slightly greater than the outside diameter of the coil springs 74, 76, as best seen in FIGS. 3 through 6 and 12. The rod 14 has a smaller diameter than the outside spring diameter and is supported spaced from the interior housing surface 86 by the radial bearing surfaces 54a-d and 56a-d, as best seen in FIGS. 3, and 7. The two springs 74, 76 are radially contained by the cylindrical inner surface 86. The close proximity of the inner surface 86 keeps the springs 74, 76 from unwinding to a significantly larger diameter than the normal spring diameter when the release lever 22 is actuated to its rod releasing position. The spring coils unwind slightly to release the rod 14 before making contact with the housing wall surface 86. This in turn causes the unwinding force of the lever 22 to be quickly transmitted from the inner coils toward the outermost coils for positive, quick release of the rod 14.

The lock 10 can be manufactured in a continuous process illustrated in FIGS. 8 through 11. The lock housing 12 is formed from a single piece of heavy gauge, e.g. 16 gauge, sheet metal cut as an initially flat housing blank 28 shown in FIG. 8. The housing blank can be cut from continuous sheet stock and fed through a progressive die in a single stamping press, where the housing blank is formed from an initially flat sheet to a closed tubular housing with integral interior bearing surfaces 54a through 64. For continuous production, the blank 28 is attached and supported between two carrier strips cut with the blank from a supply of sheet metal. The carrier strips are sheared off at an appropriate stage of the forming process.

Figures 8, 9, 10, 11:
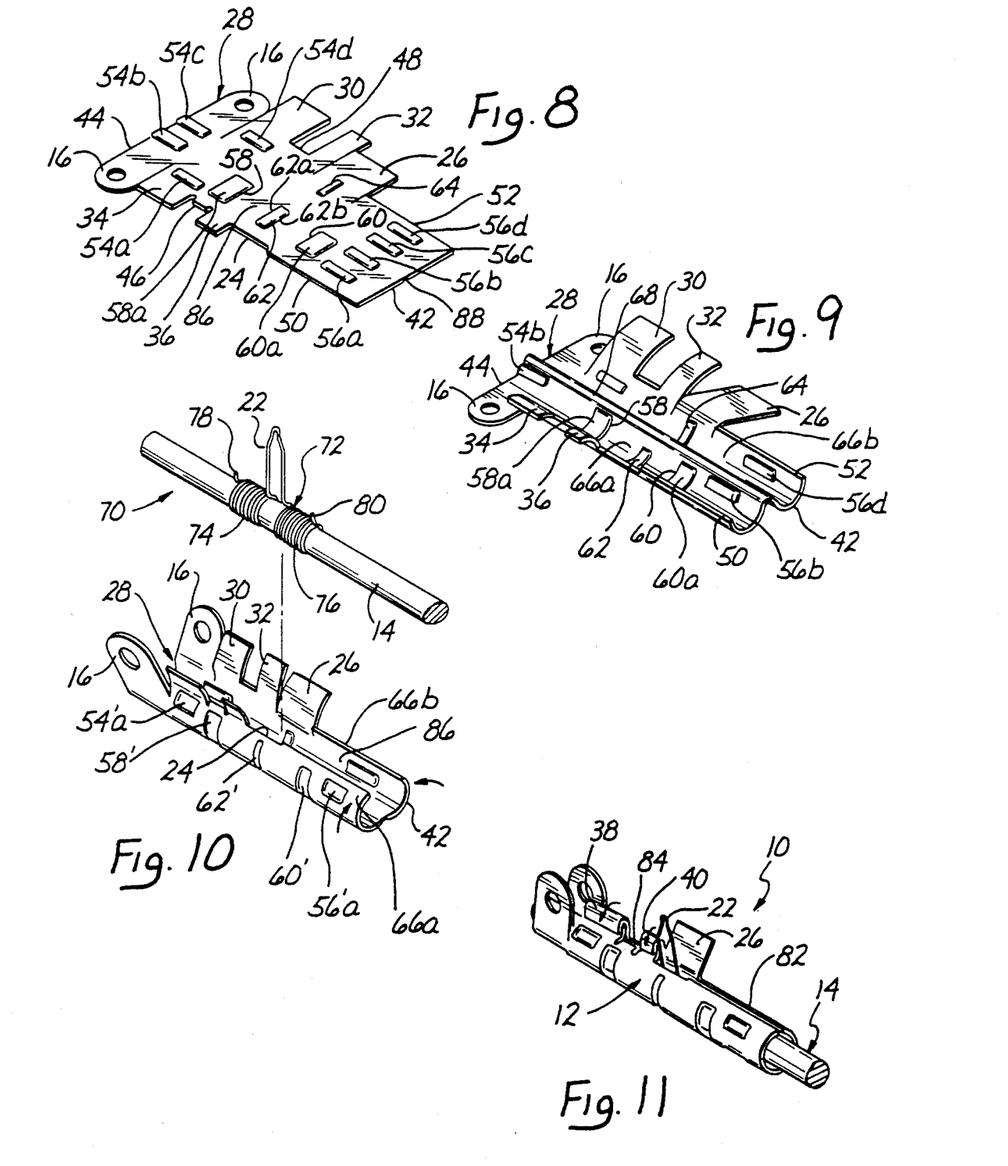
FIG. 8 is a perspective view of the flat sheet blank of the lock housing which has been embossed to define the radial rod bearing surfaces and the axial spring-end bearing surfaces at the outer and inner ends of the two coil springs.
FIG. 9 shows the one sheet blank following a first forming step resulting in two half shells joined along a hinge line.
FIG. 10 shows an intermediate stage of formation of the one piece housing wherein the two half shells have been partially closed for accepting a sub-assembly consisting of the rod and dual coil unit with integral release lever mounted on the rod.
FIG. 11 shows the half shells folded to a fully closed condition to make an operative lock housing, and secured in this condition by edge portions interlocked in a can fold.

The flat sheet blank 28 as stamped out from sheet stock in FIG. 8 has end edges 42 and 44 which define the similarly numbered ends in the finished housing 12, and longitudinal edges which include mounting lugs 16, a cut-out for the window 24, mounting tab 26, edge portions 30, 32, 34, 36 which make the two can-type folds 38, 40 in the finished housing, and two pairs of opposite, slot defining edges 46, 48 and 50, 52 which capture the spring tangs 78, 80 in the assembled lock 10. The sheet blank also has an upper surface 86, which becomes the inside surface of the finished tubular housing 12.

The flat blank 28 is then embossed to form a number of raised elements on the top surface 86, as shown in FIG. 8, which provide the interior radial and axial bearing surfaces of the lock 10. Radial bearing surfaces 54a through 54d and 56a through 56d for supporting rod 14 are positioned on the flat blank 28 so as to assume circumferentially spaced positions in the finished tubular housing 12. Each radial bearing surface is defined by the top surface of a rectangular embossed element. Two axial bearing surfaces 58 and 60 are defined by mutually facing side edges of embossed elements 58a and 60a. Finally, the two spacers 62 and 64 are also embossed on the blank 28 between the axial bearing surfaces 58, 60. All embossed elements 54a through 64 on blank 28 can be formed in a single stamping operation using an appropriate embossing die.

The flat blank 28 is again struck in the stamping press to form two parallel half shells 66a and 66b of semi-cylindrical curvature, concave on the top surface 86 and joined along a hinge line 68 extending between the end edges 42, 44 as shown in FIG. 9. The bearing surfaces defined by the embossed elements 54 through 64 rise from the concave side of the half shells and assume the semi-cylindrical curvature of the half shells. At this stage the two half shells are open, i.e. lie at approximately 180 degrees from each other at the hinge line 68 with the concave sides generally facing a common direction. A longitudinal notch 88 may be scored in the underside of the sheet blank 28, extending the length between edges 42, 44, for the purpose of weakening the sheet material at the hinge line 68 to thus facilitate folding of the blank 28 in the forming sequence of FIGS. 9, 10 and 11 to make the finished housing 12.

The half shells 66a and 66b are then folded towards each other along the hinge line 68 to a partially closed condition where the half shells form an angle of between 45 and 120 degrees at hinge line 68, as shown in FIG. 10. Depressions in the outer surface of the housing 12 resulting from embossing of elements 54 through 64 in the sheet blank 28 are designated by primed numerals corresponding to the unprimed embossed elements in housing 12.

At this stage, a preassembled cartridge 70 consisting of the rod 14 and spring unit 72 is assembled to the partially closed blank 28. Suitable mandrils may be used to ensure that the spring unit 72 is in axial and circumferential registry with the blank 28, such that the springs are positioned between the axial bearing surfaces, end tangs 78, 80 extend between the slot defining edge pairs 46, 48 and 50, 52 respectively, and release lever 22 is axially aligned with the window cut-out 24.

The partially folded blank 28 of FIG. 10 is then fully folded to a closed operative condition shown in FIG. 11, where the two half shells 66a and 66b are in opposing relationship and are separated by tang receiving slots 82 and 84 between edges 50, 52 and 46, 48 respectively, with end tangs 78, 80 captive and circumferentially fixed within slots 82, 84. The housing 12 is completed by making can-type folds 38 and 40.

The forming sequence of the sheet blank 28 can be modified to suit the choice of tooling. For example, the blank 28 may be shaped to form the half shells 66a and 66b before embossing elements 54a through 64. Instead of the notch 88, a slot can be cut between the edges 44 42 in the blank 28, interrupted to prevent separation of the two half shells 66a, 66b. Such a slot can serve to capture end tangs 78, 80 instead of the slots 82, 84.

While a presently preferred embodiment of the invention has been described and illustrated for purposes of clarity and example, it must be understood that many changes, substitutions and modification to the described embodiment can be made by those possessed of ordinary skill in the art without thereby departing from the scope and spirit of the present invention which is defined by the following claims:

What is claimed is:

1. A linear mechanical lock comprising:
   a housing formed of a single sheet of metal or the like folded to a generally tubular shape, said sheet having opposite edges, and means for holding said opposite edges in close proximity to each other for retaining said sheet in said tubular shape.
   rod bearing means spaced circumferentially about said tubular shaped housing and spring end bearing means having an overall circumferential extent lesser than said rod bearing means, said rod bearing means and said spring end bearing means being integrally formed by deformation of said single sheet;
   a rod slidably supported on said rod bearing means for axial movement through said housing;
   coil spring means coaxial with said rod and having a normal inside diameter for clutching said rod against said axial movement;
   said spring means being axially fixed between and engagable with said end bearing means such that one or more end coils of said spring means are canted to a rod locking condition under axial loading of the rod relative to said housing;
   one or more end tangs of said spring means being circumferential fixed to openings defined in said housing;
   means for unwinding said spring means for releasing said rod; and
   said housing having an inside diameter closely encompassing said spring means between said end bearing means to cause substantially even unwinding of the coils of said spring means along the length of said spring means.

2. The lock of claim 1 wherein said one or more end tangs of said spring means are circumferentially fixed in one or more longitudinal slots in said housing.

3. The lock of claim 2 wherein said one or more longitudinal slots are defined between opposite edges of said folded sheet.

4. The lock of claim 1 wherein said rod bearing means are embossed integrally with said sheet.

5. A one piece housing for a linear mechanical lock of the type having a rod axially translatable through the housing, coil spring means wound about the rod and axially fixed to the housing, said spring means having a normal inside diameter for gripping the rod against axial translation, and means for unwinding the coil spring means to release the rod, said housing comprising:

a single sheet of metal or the like formed to define two concave half shells joined along a hinge line for folding from an open condition for assembly with said rod and said spring to a closed operative condition;

rod bearing means and end bearing means interior to said half shells;

said sheet being folded to said closed condition to make a one piece housing wherein said rod is slidably supported on said rod bearing means, said spring means are axially fixed between said end bearing means so that one or more end coils of said spring means are canted to a rod locking condition under axial loading of the rod relative to said housing, and one or more end tangs of said spring means are circumferentially fixed to said housing; and interlocked edge portions of said sheet for positively securing said sheet against unfolding from said closed operative condition.

6. The lock of claim 5 wherein said housing has an inside diameter closely encompassing said spring means to cause the coils of said spring means to unwind substantially evenly along said rod.

7. The housing of claim 5 further comprising mounting lugs at one end of said housing and actuator mounting means at an intermediate point of said housing, said mounting lugs and said actuator mounting means being formed integrally with said single sheet.

8. The housing of claim 5 for a lock wherein said spring means comprise two coil springs having inner ends connected by an intermediate segment continuous with said springs and shaped to operate as an actuating lever for unwinding said springs on said rod, said housing further comprising spacer means between said inner ends of said two coil springs and formed integrally with said single sheet.

9. A linear mechanical lock comprising:

a housing formed of a single sheet of metal or the like folded to a generally tubular shape;

rod bearing means and end bearing means in said housing;

a rod slidably supported on said rod bearing means for axial movement through said housing;

coil spring means coaxial with said rod and having a normal inside diameter for clutching said rod against said axial movement;

said spring means being axially fixed between said end bearing means such that one or more end coils of said spring means are canted to a rod locking condition under axial loading of the rod relative to said housing;

one or more end tangs of said spring means being circumferentially fixed to said housing in one or more longitudinal slots in said housing defined between opposite edges of said folded sheet; and means for unwinding said spring means for releasing said rod.

* * * * *